June 25, 1957 W. REINHARD 2,797,316

CIRCUIT ARRANGEMENT GENERATING SAWTOOTH CURRENT WAVES

Filed Nov. 6, 1951

INVENTOR
W. REINHARD

United States Patent Office 2,797,316

Patented June 25, 1957

2,797,316

CIRCUIT ARRANGEMENT GENERATING SAWTOOTH CURRENT WAVES

Wolfgang Reinhard, Pforzheim, Germany, assignor to International Standard Electric Corporation, New York, N. Y., a corporation of Delaware Application November 6, 1951, Serial No. 255,100

Claims priority, application Germany November 11, 1950

3 Claims. (Cl. 250—27)

The invention relates to a circuit arrangement generating sawtooth current waves in the deflecting coils of cathode-ray tubes, in particular for television purposes, in which by a slow charging, and a rapid discharging process, or vice versa, of a capacitor a sawtooth voltage wave is generated which is applied to the grid of an amplifier tube in the plate circuit of which the deflecting coils are inserted directly or by way of a transformer. Such circuit arrangements are used preferably when the time constant of the deflecting coils is low with respect to the sawtooth period, hence for frame changeover in television.

A sawtooth current wave generated in this way exhibits originally a certain curvature even with a linear time dependence of the capacitor voltage. This curvature derives from the non-linearity of the tube characteristic, from the influence of the inductance of the output transformer bridging the deflection coil, and from time-constant components in the circuit, in particular in the circuit arrangement of the amplifier tube.

The invention relates to linearizing the sawtooth current waves by avoiding components introducing time constants, when the circuit of the amplifier tube is constructed.

A better understanding of the invention may be had from the particular description thereof made with reference to the accompanying drawings in which.

Figure 1:
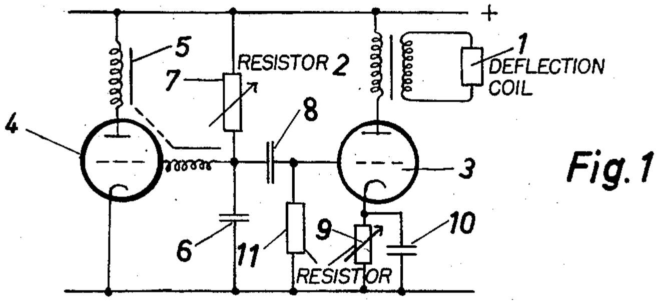
Figure 1 is a conventional frame deflection circuit of the known type.

Let us begin by viewing a conventional circuit of a frame deflection circuit such as shown in Fig. 1 of the drawing. In the figure, 1 relates to the deflecting coil shown as a resistance, as the time constant $L/R$ of the coil is low with respect to the period of the deflecting wave, 2 to the output transformer, 3 to the amplifier tube. The grid of the amplifier tube is provided with a sawtooth voltage wave by a blocking oscillator, comprising the blocking oscillator tube 4, the transformer 5, the charging capacitor 6, and the charging resistor 7. The terminal of the charging capacitor facing the grid is negative with respect to the potential of the cathode in the shown generator circuit. By the coupling capacitor 8, the D.-C. component of the wave is suppressed, so the grid of the tube 3 is fed with a pure A.-C. voltage wave. The grid bias of tube 3 is derived from resistor 9 in the cathode circuit which resistor is bridged by the capacitor 10. The grid leak resistor is shown at 11. The resistor 9 can be adjusted to allow the operating point of tube 3 to be controlled to achieve a sawtooth current wave as linear as possible.

The linearity standards are impaired in this known circuit by the time constants to the components 8, 11 and 9, 10, of which the time constant 9, 10 is by far more annoying, and it can be held within somewhat acceptable limits only by a very large and expensive capacitor 10.

The circuit proposed by this invention, in which the potential of the voltage wave produced by the sawtooth generator is negative to ground, is now characterized by connection in which the cathode of the amplifier tube is connected directly to ground, and that the grid is so coupled galvanically to the sawtooth generator by way of a fixed or adjustable voltage divider, that the average potential of the sawtooth wave can be considerably shifted by means of the voltage divider tap without appreciably affecting the A.-C. amplitude.

In the circuit arrangement in accordance with the invention, the time-constant member 9, 10 in the cathode circuit of tube 3 of Fig. 1 is entirely omitted with its detrimental effect to linearity, so the linearity is improved and the circuit is less costly as the big expensive electrolytic capacitor is no longer necessary.

Figure 2:
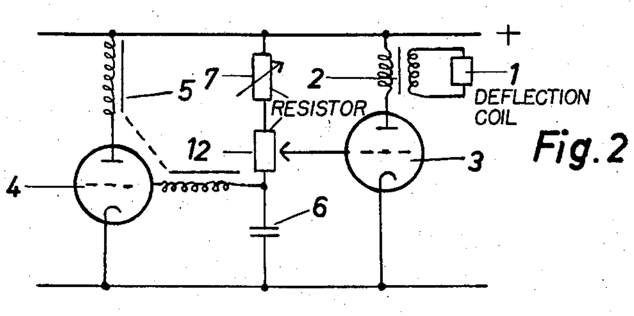
Figures 2, 3 and 4 illustrate alternative circuits embodying principles of this invention.
Figure 3:
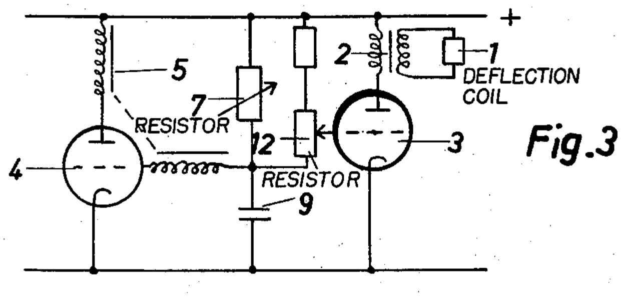
Figure 4:
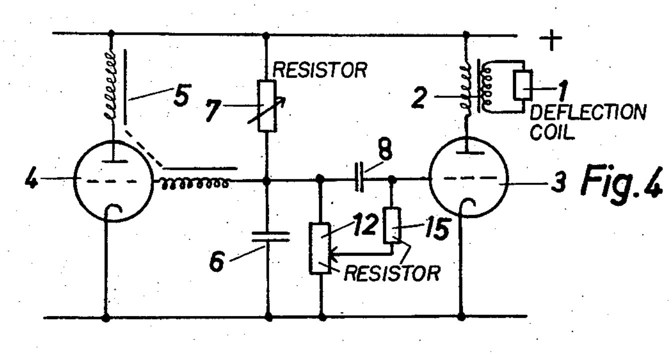

Three embodiments of the invention are shown in the Figs. 2 to 4, in which equivalent circuit elements are given the same numerals. A blocking oscillator 4, 5, 6, 7, which generates a sawtooth voltage wave negative with respect to ground serves as the sawtooth generator. The average potential of this wave is however so far negative that this sawtooth voltage wave cannot be applied directly to the grid of tube 3, as this would place the operating point too unfavorably, and make the achievement of a linear current rise impossible. It is thus necessary, to make the average sawtooth voltage potential less negative.

In Fig. 2, a potentiometer 12 has thus been connected in series with the charging resistor 7, and may even be part of the charging resistance, the intermediate tap of which is galvanically connected with the grid of the applifier tube 3. By a suitable adjustment of the potentiometer wiper 12, the average potential of the sawtooth wave can be shifted without appreciably affecting the A.-C. voltage amplitude.

A slight drawback of this circuit consists however in the fact that any changes in the charging resistance (frequency adjustment) affect the operating point.

This is eliminated in a circuit in accordance with Fig. 3, in which the potentiometer 12 bridges the charging resistor 7. Frequency and average potential can be adjusted fully independently one from the other.

Fig. 4 shows one more embodiment. The potentiometer 12 is here connected across the charging capacitor 6 of the blocking oscillator, and the wiper of this potentiometer is connected galvanically over one more resistor 15 with the grid of the amplifier tube.

In this circuit, a coupling capacitor 8 is required which indeed again introduces a certain time constant, which however can be neglected in comparison with the time constant of the bridging capacitor 10 of Fig. 1. Over this circuit, the circuit of Fig. 4 has the advantage, that changes in the charging resistor will not shift the operating point of the tube, and that the A.-C. voltage amplitude of the sawtooth voltage wave is not affected in setting the average potential (grid bias) on the potentiometer 14.

What is claimed is:

1. In a sweep wave generating circuit in which the generator comprises a first electron tube having connections including a condenser and a charging resistor, in series, connected between a common reference potential source and a positive terminal of said potential source whereby said generator acts as a blocking oscillator producing negative sawtooth waves, an amplifier having anode, grid and cathode electrodes, input means for applying said sawtooth wave to said amplifier grid electrode, and an output anode circuit for deriving the deflection currents coupled to said anode electrode, means to provide improved linearity of said sweep currents comprising a direct, substantially impedance free connection between said cathode and said common reference potential source, a voltage divider including said condenser, said charging resistor and a potentiometer resistor connected between said positive potential terminal and said common reference potential source, said input means comprising a galvanic connection from an intermediate point on said potentiometer resistor to said amplifier grid to provide the sole input means for said amplifier.

2. A circuit according to claim 1 in which said voltage divider comprising a variable potentiometer in series with said condenser and resistor.

3. A circuit according to claim 1 in which said voltage divider comprising a potentiometer connected in parallel with said resistor.

References Cited in the file of this patent

UNITED STATES PATENTS

| | | |
|---|---|---|
| 2,300,189 | Wolff | Oct. 27, 1942 |
| 2,391,082 | Beste | Dec. 18, 1945 |
| 2,532,763 | Jacob | Sept. 26, 1950 |
| 2,562,985 | Kronenberg | Aug. 7, 1951 |